(12) United States Patent
Michels et al.

(10) Patent No.: US 11,124,169 B2
(45) Date of Patent: Sep. 21, 2021

(54) SYSTEM COMPRISING SEPARATE CONTROL UNITS FOR THE ACTUATION UNITS OF AN ELECTRIC PARKING BRAKE

(71) Applicant: Lucas Automotive GmbH, Koblenz (DE)

(72) Inventors: Erwin Michels, Kail (DE); Benedikt Ohlig, Vallendar (DE); Matthias Fuchs, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 183 days.

(21) Appl. No.: 16/343,013

(22) PCT Filed: Oct. 10, 2017

(86) PCT No.: PCT/EP2017/075729
§ 371 (c)(1),
(2) Date: Apr. 18, 2019

(87) PCT Pub. No.: WO2018/073039
PCT Pub. Date: Apr. 26, 2018

(65) Prior Publication Data
US 2020/0055506 A1 Feb. 20, 2020

(30) Foreign Application Priority Data

Oct. 20, 2016 (DE) .......................... 102016012617.5

(51) Int. Cl.
*B60T 13/74* (2006.01)
*F16D 65/18* (2006.01)
(Continued)

(52) U.S. Cl.
CPC .............. *B60T 13/74* (2013.01); *F16D 65/18* (2013.01); *B60T 8/17* (2013.01); *B60T 13/146* (2013.01);
(Continued)

(58) Field of Classification Search
CPC .............. F16D 2066/003; F16D 65/18; F16D 2121/24; B60T 13/146; B60T 13/74; B60T 8/17
(Continued)

(56) References Cited

U.S. PATENT DOCUMENTS 6,406,102 B1 * 6/2002 Arnold .................... B60T 7/042
303/20
6,550,870 B1 * 4/2003 Goodzey ................ B60T 8/885
303/15
(Continued)

FOREIGN PATENT DOCUMENTS

AU 2014280873 A1 * 8/2015 .............. B60T 17/22
CN 100400922 C * 7/2008
(Continued)

OTHER PUBLICATIONS

German Search Report, Application No. 102016012617.5, dated May 30, 2017.
(Continued)

*Primary Examiner* — Atul Trivedi
(74) *Attorney, Agent, or Firm* — Robert James Harwood

(57) ABSTRACT

A motor vehicle system comprising a first electric parking brake actuation unit assigned to a first vehicle wheel, and a second electric parking brake actuation unit assigned to a second vehicle wheel. The system further comprises a first control unit which includes at least one first microprocessor and which is designed to control at least the first electric parking brake actuation unit and an anti-lock and/or vehicle stability control system. A second control unit of the system comprises at least one second microprocessor and is designed to control at least the second electric parking brake actuation unit and an electric braking power generator and/or an automatic transmission. In some variants, a separate parking brake control unit can be dispensed with as the
(Continued)

braking brake control function is shared between control units that can be used for other purposes.

23 Claims, 5 Drawing Sheets

(51) Int. Cl.
  *B60T 8/17* (2006.01)
  *B60T 13/14* (2006.01)
  *F16D 66/00* (2006.01)
  *F16D 121/24* (2012.01)

(52) U.S. Cl.
  CPC .... *F16D 2066/003* (2013.01); *F16D 2121/24* (2013.01)

(58) Field of Classification Search
  USPC .......................................................... 701/70
  See application file for complete search history.

(56) References Cited

U.S. PATENT DOCUMENTS

| | | | | |
|---|---|---|---|---|
| 6,702,405 | B1* | 3/2004 | Balz | B60T 7/107 303/192 |
| 10,589,738 | B1* | 3/2020 | Boecker | B60T 8/17616 |
| 2003/0006644 | A1* | 1/2003 | MacGregor | B60T 13/686 303/3 |
| 2004/0024513 | A1* | 2/2004 | Aizawa | B60T 8/4872 701/70 |
| 2007/0029876 | A1* | 2/2007 | Makishima | B60T 13/74 303/191 |
| 2008/0086252 | A1* | 4/2008 | Nakayama | B60T 7/122 701/80 |
| 2008/0086253 | A1* | 4/2008 | Nakayama | B60T 7/122 701/80 |
| 2008/0105502 | A1* | 5/2008 | Koth | B60T 7/085 188/72.6 |
| 2010/0252378 | A1* | 10/2010 | Hilberer | B60T 13/683 188/106 F |
| 2010/0299035 | A1* | 11/2010 | Maron | B60T 13/746 701/70 |
| 2011/0082631 | A1* | 4/2011 | Busack | B60T 7/085 701/70 |
| 2011/0168518 | A1* | 7/2011 | Hilberer | B60T 1/062 192/219.4 |
| 2013/0073163 | A1* | 3/2013 | Liu | B60T 7/12 701/70 |
| 2013/0275019 | A1* | 10/2013 | Murata | B60T 7/22 701/70 |
| 2013/0282249 | A1* | 10/2013 | Heise | B60T 13/588 701/70 |
| 2015/0066326 | A1* | 3/2015 | Furuyama | B60T 13/146 701/70 |
| 2015/0073675 | A1* | 3/2015 | Malone | B60W 10/06 701/70 |
| 2015/0224969 | A1* | 8/2015 | Huennekens | B60T 8/17 701/48 |
| 2015/0353067 | A1* | 12/2015 | Knechtges | B60T 7/042 701/70 |
| 2016/0032995 | A1* | 2/2016 | Nishino | F16D 55/226 188/72.3 |
| 2018/0236974 | A1* | 8/2018 | Kubb | B60T 17/221 |
| 2018/0237016 | A1* | 8/2018 | Khafagy | B60T 8/32 |
| 2019/0135249 | A1* | 5/2019 | Fridman | B60T 8/32 |
| 2019/0337502 | A1* | 11/2019 | Farres | B60T 13/683 |
| 2019/0344762 | A1* | 11/2019 | Alfter | B60W 50/023 |
| 2020/0109753 | A1* | 4/2020 | Northrup | B60K 23/0808 |
| 2020/0238962 | A1* | 7/2020 | Stoehr | B60T 8/171 |

FOREIGN PATENT DOCUMENTS

| | | | | |
|---|---|---|---|---|
| CN | 104417511 | A | * | 3/2015 |
| CN | 105102283 | A | * | 11/2015 ............... B60L 7/18 |
| CN | 103318031 | B | * | 12/2016 ............... B60T 7/12 |
| CN | 110654363 | A | * | 1/2020 |
| CN | 110709294 | A | * | 1/2020 ........... B60T 8/1701 |
| CN | 107921935 | B | * | 5/2020 ........... B60T 13/145 |
| DE | 19732168 | C1 | | 1/1999 |
| DE | 102005039314 | A1 | | 2/2007 |
| DE | 102012010562 | A1 | | 11/2013 |
| DE | 102015202012 | A1 | * | 8/2015 .......... B60W 10/182 |
| DE | 102015200928 | A1 | | 7/2016 |
| DE | 102016015544 | A1 | * | 6/2018 .......... B60W 50/023 |
| EP | 2719593 | A1 | | 4/2014 |
| JP | 2003327099 | A | * | 11/2003 |
| JP | 2003327100 | A | * | 11/2003 |
| JP | 2006137219 | A | * | 6/2006 |
| JP | 2007296902 | A | * | 11/2007 |
| JP | 2008241005 | A | * | 10/2008 |
| JP | 2009166656 | A | * | 7/2009 |
| JP | 4330569 | B2 | * | 9/2009 |
| JP | 2012162192 | A | * | 8/2012 |
| JP | 2016032997 | A | * | 3/2016 |
| JP | 2017024690 | A | * | 2/2017 |
| JP | 2018052267 | A | * | 4/2018 |
| WO | WO-2005033541 | A1 | * | 4/2005 ............. B60T 8/489 |
| WO | WO-2005093279 | A1 | * | 10/2005 ................ B60T 8/32 |
| WO | WO-2005093280 | A1 | * | 10/2005 ............. F16D 65/18 |
| WO | WO-2005093281 | A1 | * | 10/2005 ............. F16D 65/567 |
| WO | WO-2005093282 | A1 | * | 10/2005 ............. F16D 65/18 |
| WO | 2006061238 | A1 | | 6/2006 |
| WO | WO-2008119442 | A1 | * | 10/2008 ........... B60T 13/746 |
| WO | WO-2009093395 | A1 | * | 7/2009 ........... F16H 63/483 |
| WO | WO-2010128561 | A1 | * | 11/2010 ............. B60T 1/062 |
| WO | WO-2012052380 | A2 | * | 4/2012 ............. B60T 7/042 |
| WO | WO-2014013971 | A1 | * | 1/2014 ................ B60T 8/17 |
| WO | WO-2016066450 | A1 | * | 5/2016 ........... B60T 13/741 |
| WO | WO-2016104680 | A1 | * | 6/2016 ........... B60T 13/746 |
| WO | WO-2016146222 | A2 | * | 9/2016 ........... B60T 13/686 |
| WO | WO-2016186164 | A1 | * | 11/2016 ................ B60T 8/17 |
| WO | WO-2018073038 | A1 | * | 4/2018 ............. B60T 7/085 |
| WO | WO-2018073039 | A1 | * | 4/2018 ............. B60T 13/74 |

OTHER PUBLICATIONS

PCT International Search Report and Written Opinion, Application No. PCT/EP2017/075729, dated Feb. 1, 2018.

PCT International Search Report and Written Opinion, Application No. PCT/EP2017/075729, dated Oct. 16, 2018.

* cited by examiner

SYSTEM COMPRISING SEPARATE CONTROL UNITS FOR THE ACTUATION UNITS OF AN ELECTRIC PARKING BRAKE

CROSS-REFERENCE TO RELATED APPLICATIONS

This application is a national stage of International Application No. PCT/EP2017/075729, filed 10 Oct. 2017, the disclosures of which are incorporated herein by reference in entirety, and which claimed priority to German Patent Application No. 10 2016 012 617.5, filed 20 Oct. 2016, the disclosures of which are incorporated herein by reference in entirety.

BACKGROUND TO THE INVENTION

The present disclosure relates generally to the field of the control units to be fitted in a vehicle. Specifically, the control of an electric parking brake is described.

Electric parking brakes (EPB) are now being used in a large number of modern motor vehicles. Such EPB systems conventionally comprise two electric actuation units at different vehicle wheels as well as an EPB control unit associated with the actuation units.

In a hydraulic brake system, the EPB actuation units are fitted to the wheel brakes of two opposite vehicle wheels and allow a respective wheel brake cylinder to be actuated electrically in parking brake operation (details thereof will be found, for example, in DE 197 32 168 A). In normal braking operation, on the other hand, the wheel brake cylinders are actuated hydraulically. To that end, the wheel brake cylinders are fluidically connected to a main cylinder.

In a conventional hydraulic brake system, the main cylinder is mechanically coupled with a brake pedal. In a so-called brake-by-wire system, on the other hand, the brake pedal—at least in normal braking operation—is mechanically decoupled from the main cylinder. Actuation of the brake pedal is here detected by means of a sensor and processed electronically to control an electric actuation unit acting on the main cylinder. Also known are electric brake boosters (EBB), in which a force transmitted to the main cylinder by means of the brake pedal is boosted by an electric actuation unit which likewise acts on the main cylinder.

Because of the cost pressure in the vehicle industry, it is desirable to reduce the system costs by making savings. At the same time, the safety of the system must not suffer from the corresponding savings. These requirements also apply in particular to the brake system fitted in the vehicle.

In this connection, it is proposed, for example, in WO 2006/061238 A1 to control EPB actuation units by means of the control unit associated with an automatic transmission. In this manner, it is possible to save on a conventional transmission lock in the form of a parking lock. WO 2006/061238 A1 further contains different suggestions for a redundant design of the communication links in an EPB system, in order to increase the safety of the system.

SUMMARY OF THE INVENTION

A feature underlying the present disclosure is to provide an improved system of control units in the context of an EPB.

According to a first aspect there is provided a system for a motor vehicle which comprises a first electric parking brake actuation unit assigned to a first vehicle wheel and a second electric parking brake actuation unit assigned to a second vehicle wheel. The system further comprises a first control unit having at least one first microprocessor, wherein the first control unit is designed to control the first electric parking brake actuation unit and does not allow control of the second electric parking brake actuation unit. In addition, the system comprises a second control unit having at least one second microprocessor, wherein the second control unit is designed to control the second electric parking brake actuation unit and does not allow control of the first electric parking brake actuation unit.

According to a further aspect there is provided a system for a motor vehicle which comprises a first electric parking brake actuation unit assigned to a first vehicle wheel and a second electric parking brake actuation unit assigned to a second vehicle wheel. The system further comprises a first control unit having at least one first microprocessor, wherein the first control unit is designed to control at least the first electric parking brake actuation unit and also an antilock and/or electronic stability control system. In addition, the system comprises a second control unit having at least one second microprocessor, wherein the second control unit is designed to control at least the second electric parking brake actuation unit and also an electric brake force generator and/or an automatic transmission.

The electric parking brake actuation units can be based on an electromechanical principle. In other variants, the electric parking brake actuation units can be operated electrohydraulically or electropneumatically.

The motor vehicle system according to the first or the second aspect can further comprise a control line system which connects the first control unit and the second control unit on the one hand with the first electric parking brake actuation unit and the second electric parking brake actuation unit on the other hand. The control line system can consist of a first control line between the first control unit and the first electric parking brake actuation unit and a second control line between the second control unit and the second electric parking brake actuation unit.

Thus, in particular in the system according to the first aspect, a further control line which connects the first control unit with the second electric parking brake actuation unit and/or the second control unit with the first electric parking brake actuation unit can be absent. In the system according to the second aspect, on the other hand, in a variant, the first control unit can be connected via suitable control lines with both the first electric parking brake actuation unit and the second electric parking brake actuation unit. Alternatively or in addition, in the system according to the second aspect the second control unit can be connected via suitable control lines both with the first electric parking brake actuation unit and with the second electric parking brake actuation unit.

In the motor vehicle system according to the first aspect or the second aspect there can further be provided a control system which is provided for controlling the first electric parking brake actuation unit and the second electric parking brake actuation unit. The control system can consist of the first control unit and the second control unit. Thus, in particular, a further control unit which allows control of the first electric parking brake actuation unit and/or the second electric parking brake actuation unit can be absent from the vehicle.

In the system according to the first aspect, one of the first and second control units can be designed to control an antilock and/or electronic stability control system. Likewise, according to this aspect, one of the first and second control units can be designed to control an automatic transmission.

In this aspect, one of the first and second control units, or a third control unit, can further be designed to control an electric brake force generator. In another variant of the first aspect, a third control unit having at least one third microprocessor can be provided, wherein the third control unit is designed to control an electric brake force generator, wherein one of the first and second control units is designed to control an antilock and/or electronic stability control system and the other of the first and second control units is designed to control an automatic transmission.

Similarly, in the motor vehicle system according to the second aspect, a third control unit having at least one third microprocessor can be provided. This third control unit can be designed to control the electric brake force generator, wherein the second control unit is designed to control the automatic transmission.

In both of the aspects described herein, the electric brake force generator can comprise a third electric actuation unit which is configured to act on a main cylinder of an electrohydraulic brake system so as to generate at least one brake force component. The electric brake force generator can be used as a brake booster for electrically boosting a brake force component transmitted to the main cylinder by the driver. Alternatively, the third electric actuation unit can be configured to generate the entire brake force by acting on the main cylinder (for example within the scope of autonomous driving or in brake-by-wire operation).

In all of the aspects presented herein there can be an input device which is configured to generate a parking brake command. The input device can be, for example, a button, switch, etc. which can be operated by a driver. The input device can be electrically coupled at least with the first control unit in order to signal the parking brake command to the first control unit. Alternatively or in addition, the input device can be electrically coupled with the second control unit or the third control unit in order to signal the parking brake command to the corresponding control unit. The first control unit can in turn be configured to control the first electric parking brake actuation unit in dependence on the parking brake command. In the same manner, the second or third control unit can, additionally or alternatively, be configured to control the second electric parking brake actuation unit in dependence on the parking brake command.

The parking brake command can in general be directed to an activation (i.e. application) or release of the parking brake. Accordingly, the control of the respective control unit can be directed to an activation or release of the corresponding parking brake actuation unit.

In all of the aspects presented herein, a communication link can further be provided between the first control unit and the second control unit (and further control units which are optionally provided). The first control unit and the second control unit (and further control units which are optionally provided) can be designed to communicate with one another via the communication link. The communication link can be redundantly designed. For example, two bus or line systems configured in parallel with one another can be provided.

The first control unit can be designed to communicate the parking brake command to the second control unit via the communication link. By means of this communication, the first control unit can in particular cause the second control unit to control the second electric parking brake actuation unit on the basis of the parking brake command.

According to the first or the second aspect of the motor vehicle system described herein, the second control unit can be designed to control an automatic transmission which is configured without a mechanical transmission lock. In this case, the second control unit can control the second electric parking brake control unit in a transmission lock mode. According to the second aspect of the vehicle system described herein, the second control unit can further be configured also to control the first electric parking brake actuation unit in transmission lock mode. Transmission lock mode can in particular be activated in that an input device associated with the transmission is brought into a park position by the driver. The transmission lock mode also includes the situation where the corresponding input device of the automatic transmission is moved from the park position into a drive position. Different transmission lock commands can thus be generated by means of the input device, according to whether the park position is assumed or left. While in the first case the parking brake actuation units are activated, in the last-mentioned case the release of the parking brake actuation units is initiated.

In particular according to the second aspect of the motor vehicle system presented herein, the second control unit can be designed to communicate with the first control unit via the communication link in transmission lock mode in order to cause the first control unit to control the first electric parking brake actuation unit on the basis of the transmission lock command.

In all of the aspects presented herein, the system can further comprise a first power supply system (for example in the form of a battery or accumulator) for the first control unit and/or the first electric parking brake actuation unit. In the same manner, a second power supply system for the second control unit (or the third control unit) and/or the second electric parking brake actuation unit can be present.

The first vehicle wheel can generally be a right front wheel. In addition or alternatively, the second vehicle wheel can be a left front wheel. In other variants, the first vehicle wheel can be a right rear wheel, while the second vehicle wheel is a left rear wheel. A diagonal division is also possible, according to which the first vehicle wheel is arranged on a front axle and the second vehicle wheel is arranged diagonally opposite on a rear axle.

At least one electric generator can further be provided. The function of the at least one generator can be provided by an electric drive of the motor vehicle (which then works in generator operation) or by an electrical machine operated solely in generator operation.

One electric generator can be provided per vehicle axle or per vehicle wheel. In a variant, the at least one electric generator can be coupled with the right rear wheel and/or the left rear wheel of the vehicle. In an alternative or cumulative embodiment, the at least one electric generator can be coupled with the right front wheel and/or the left front wheel of the vehicle. Such a coupling can in particular be made selectively when a braking action is to be generated at the corresponding rear wheel by means of the generator operation (e.g. within the scope of autonomous driving, including autonomous parking).

In general, the first control unit and the second control unit, as well as the third control unit which is optionally provided, can be provided spatially separately from one another. This spatial separation can be realised, for example, by separate housings for the control units. The individual control units can also be fitted at different locations in the vehicle.

According to a third aspect there is provided a method for controlling a motor vehicle system which comprises a first electric parking brake actuation unit assigned to a first vehicle wheel, a second electric parking brake actuation unit assigned to a second vehicle wheel, a first control unit having at least one first microprocessor, wherein the first control unit is designed to control the first electric parking brake actuation unit and does not allow control of the second electric parking brake actuation unit, and a second control unit having at least one second microprocessor, wherein the second control unit is designed to control the second electric parking brake actuation unit and does not allow control of the first electric parking brake actuation unit. The method comprises the steps of controlling the first electric parking brake actuation unit by means of the first control unit without controlling the second electric parking brake actuation unit by means of the first control unit, and of controlling the second electric parking brake actuation unit by means of the second control unit without controlling the first electric parking brake actuation unit by means of the second control unit.

According to a fourth aspect there is provided a method for controlling a motor vehicle system which comprises a first electric parking brake actuation unit assigned to a first vehicle wheel, a second electric parking brake actuation unit assigned to a second vehicle wheel, a first control unit having at least one first microprocessor, wherein the first control unit is designed to control at least the first electric parking brake actuation unit and also an antilock and/or electronic stability control system, and a second control unit having at least one second microprocessor, wherein the second control unit is designed to control at least the second electric parking brake actuation unit and also an electric brake force generator and/or an automatic transmission. The method comprises the steps of controlling the first electric parking brake actuation unit by means of the first control unit and of controlling the second electric parking brake actuation unit by means of the second control unit.

The control steps of the method according to the third aspect or according to the fourth aspect can be carried out substantially at the same time. Furthermore, the respective method can include the detection of a control command, wherein the control command is a parking brake command on the part of the driver, a transmission lock command on the part of the driver or an emergency brake command.

According to a further aspect there is provided a computer program with program code for carrying out the method according to the third or the fourth aspect when the corresponding method is carried out by the first control unit and the second control unit. There is also provided a controller system which comprises the computer program and also the first control unit and the second control unit, which are designed to execute the computer program.

Other advantages of this invention will become apparent to those skilled in the art from the following detailed description of the preferred embodiments, when read in light of the accompanying drawings.

DETAILED DESCRIPTION OF THE INVENTION

Exemplary embodiments of the present disclosure are explained hereinbelow by means of the drawings, wherein FIG. 1 and FIG. 2 each show schematically an electronically controlled vehicle system.

Figure 1:
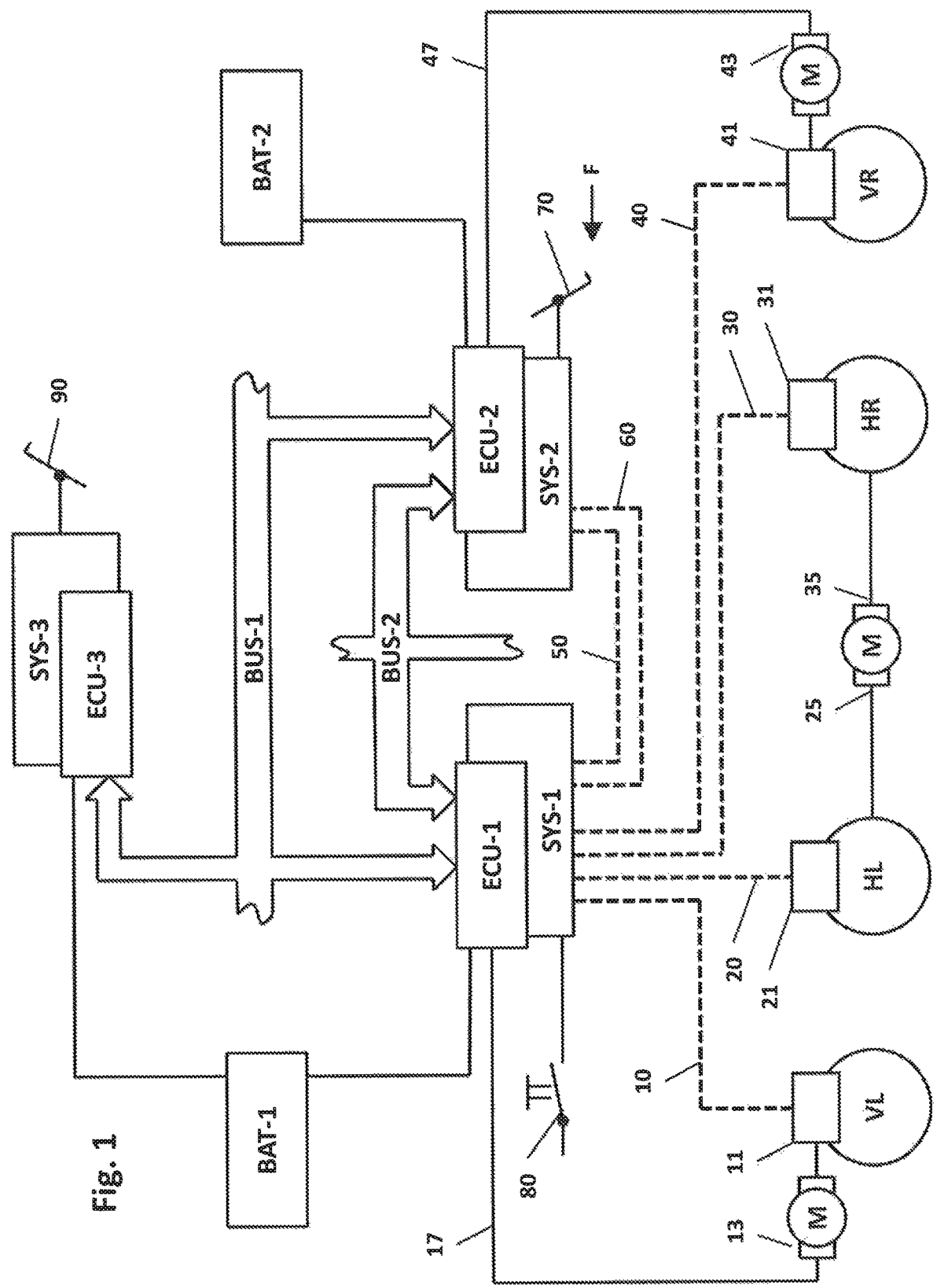
FIG. 1 shows a first exemplary embodiment of a redundantly designed vehicle system.
Figure 2:
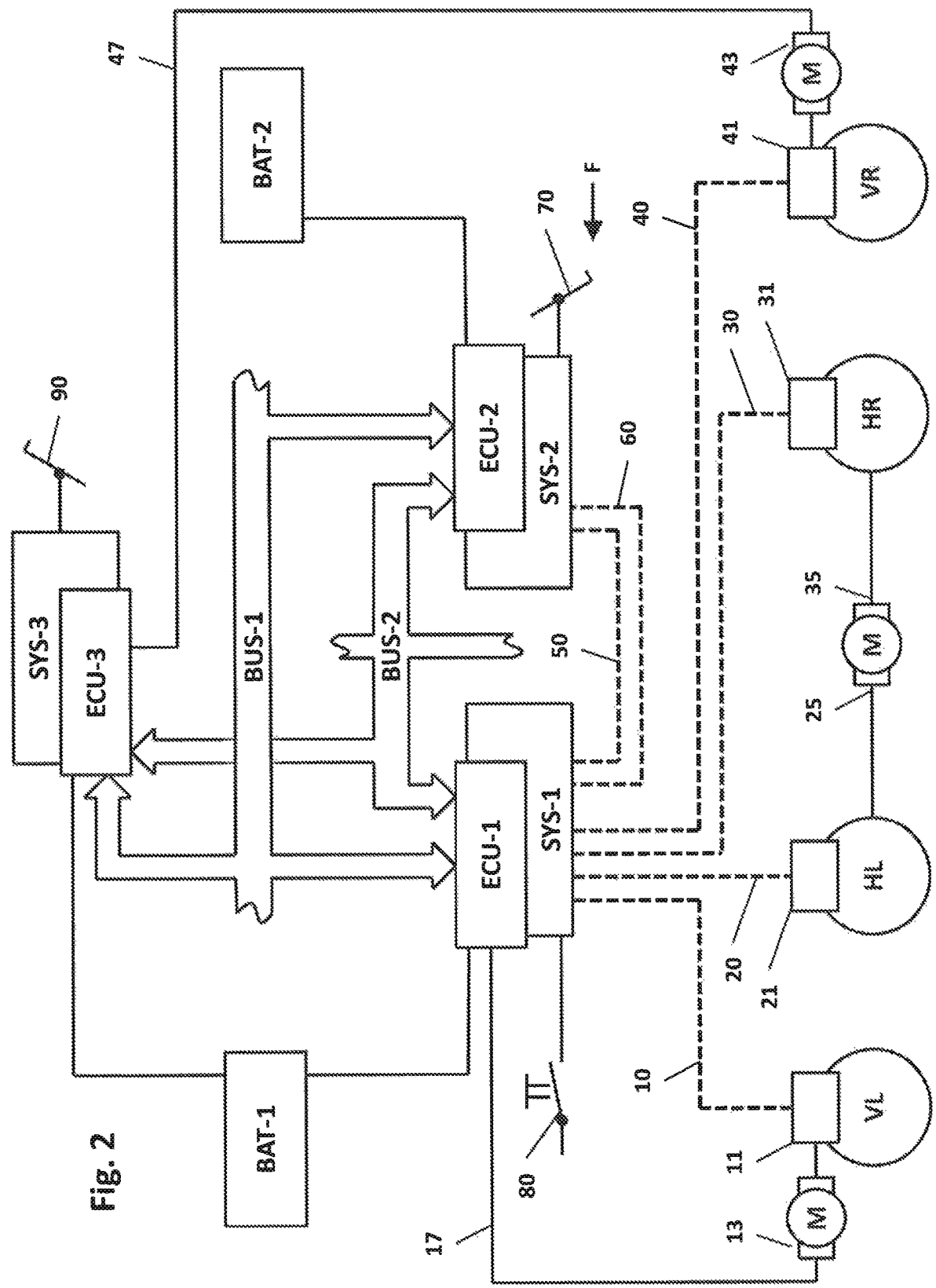
FIG. 2 shows a second exemplary embodiment of a redundantly designed vehicle system.
Figure 3:
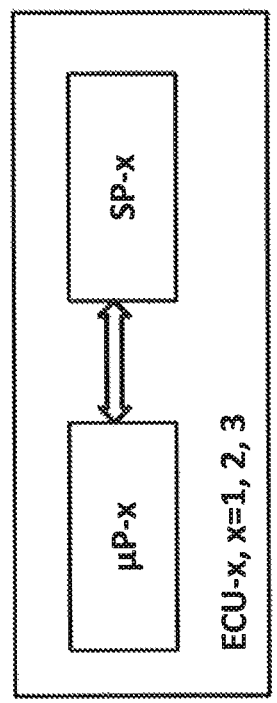
FIG. 3 shows an exemplary embodiment of a control unit, in particular for a vehicle system.

The respective system according to FIG. 1 and FIG. 2 comprises a first subsystem SYS-1 and a second subsystem SYS-2. The first subsystem SYS-1 comprises a first electronic control unit (ECU) ECU-1 and the second subsystem SYS-2 comprises a second electronic control unit ECU-2. Each of the two control units ECU-1 and ECU-2 comprises at least one microprocessor μP and at least one memory device SP, as shown in FIG. 3. The respective memory device SP, for example a solid state memory, contains program code for execution by the respective microprocessor μP.

For supplying power to the two subsystems SYS-1 and SYS-2 including the two electronic control units ECU-1 and ECU-2, a first accumulator BAT-1 and a second accumulator BAT-2 are used. The first electronic control unit ECU-1 and optionally further components of the first subsystem SYS-1 are operated (at least) at the first accumulator BAT-1; the second electronic control unit ECU-2 and optionally further components of the second subsystem SYS-2 are operated (at least) at the second accumulator BAT-2. The system as a whole thus has high operational reliability because, in the case of a faulty first accumulator BAT-1, (at least) the second electronic control unit ECU-2 (and optionally the entire second subsystem SYS-2) can continue to operate. Likewise, in the case of a faulty second accumulator BAT-2, (at least) the first electronic control unit ECU-1 (and optionally the entire first subsystem SYS-1) can continue to operate.

For communication (e.g. for data transfers, transfers of control commands, etc.) between the two subsystems SYS-1 and SYS-2, and in particular between the two electronic control units ECU-1 and ECU-2, a first bus system BUS-1 and a second bus system BUS-2 are provided. For high operational reliability of the system as a whole, the two bus systems BUS-1 and BUS-2 are arranged redundantly in parallel in relation to the two subsystems SYS-1 and SYS-2 (in particular in relation to the two electronic control units ECU-1 and ECU-2). Thus, in the case of a faulty bus system BUS-1 or BUS-2, communication can be maintained by means of the other bus system BUS-2 or BUS-1. Since vehicles are nowadays in any case equipped with bus systems, for example a CAN (controller area network) bus, such systems can also be used for at least one of the two bus systems BUS-1 and BUS-2 in order to save additional outlay.

Hydraulically actuatable wheel brakes 11, 21, 31 and 41 of the vehicle are connected to the first subsystem SYS-1, more precisely to a hydraulic control unit (HCU) thereof, via hydraulic lines 10, 20, 30 and 40. In the exemplary embodiments, the first subsystem SYS-1 is an electrohydraulic system which allows the brake pressures in the wheel brakes 11, 21, 31 and 41 to be generated and regulated independently of the driver and individually. The first subsystem SYS-1 can therefore be or comprise a control system, for example an antilock and/or electronic stability control system (ABS or ESC) which is nowadays provided as standard in vehicles.

The second subsystem SYS-2 is connected via hydraulic lines 50, 60 to the first subsystem SYS-1. In the exemplary embodiments, the second subsystem SYS-2 is designed to generate brake pressures for the first subsystem SYS-1 and/or the wheel brakes 11, 21, 31 and 41. In order to understand the possibilities which arise from the "and/or" linkages between the expressions "the first subsystem SYS-1" and "the wheel brakes 11, 21, 31 and 41" hereinabove and hereinbelow, the following variants will be explained by way of example:

The second subsystem SYS-2 generates the brake pressures directly for the wheel brakes 11, 21, 31 and 41 via the hydraulic lines 50, 60 when the first system SYS-1 is passive, that is to say no (e.g. superimposed) control interventions are carried out at the individual wheels, such as, for example, ABS or ESC control.

If, however, the first subsystem SYS-1 is active, for example in order to carry out ABS or ESC control, the second subsystem SYS-2 can in some variants provide brake pressures to the first subsystem SYS-1 on the input side via the hydraulic lines 50, 60, so that the first subsystem SYS-1 is able to control brake pressures for the wheel brakes 11, 21, 31 and 41 at the individual wheels on the output side (e.g. by maintaining, increasing or lowering the brake pressure). Such control can also take place when the second subsystem SYS-2 does not provide brake pressures. For this purpose, the first subsystem SYS-1 comprises a separate brake pressure generator (e.g. an electrically operated hydraulic pump).

Since individual control interventions are not always required at all the wheel brakes at the same time, for example if, within the scope of ESC control, only a front wheel on the outside of a bend is to be braked in order to prevent understeer of the vehicle, combinations of the two possibilities mentioned above are usual in practical operation.

The second subsystem SYS-2 is generally a brake force generator designed as a brake pressure generator system, such as, for example, an assembly having an electric brake booster (EBB) which, in the case of a hydraulic system design, acts on a main cylinder. The second subsystem SYS-2, as a brake force generator, is configured to perform one or more of the following functions:

to detect a braking request made by the driver via a brake pedal 70, which is directed at slowing down the motor vehicle;

to boost an actuating force F transmitted by the driver via the brake pedal 70 by means of an electric actuation unit by the electrical, electrohydraulic or electropneumatic principle;

to generate the brake pressures for the first subsystem SYS-1 and/or the wheel brakes 11, 21, 31 and 41 by means of an electric actuation unit by the electrical, electrohydraulic or electropneumatic principle.

The second subsystem SYS-2 can thus be operated inter alia in one or more of the following operating modes:

For the function of a hydraulic service brake, that is to say in normal braking, the actuating force F applied by the driver via the brake pedal 70 is boosted in particular by means of an electric actuation unit, the brake pressures for the first subsystem SYS-1 and/or the wheel brakes 11, 21, 31 and 41 being generated in a main cylinder in dependence on the boosted actuating force, preferably according to a predetermined booster characteristic.

If the brake system, and in particular the second subsystem SYS-2, is designed as a BBW (brake-by-wire) system, for the function of the service brake, and thus for normal braking, the deceleration request initiated by the driver via the brake pedal 70 is detected in order, in dependence thereon, to generate brake pressures for the first subsystem SYS-1 and/or the wheel brakes 11, 21, 31 and 41. The deceleration request is thereby determined by means of a suitable sensor system which detects the force and/or travel characteristic initiated at the brake pedal 70. The deceleration request is then converted by the electronic control unit ECU-2 into a control signal for an electric actuation unit, which acts on a main cylinder. The brake pedal 70, on the other hand, remains decoupled from the main cylinder. A simulator can impart a conventional pedal feel to the driver despite the decoupling. In the case of emergency braking, for example braking that must be ensured despite a faulty accumulator BAT-2, the brake pressures for the first subsystem SYS-1 and/or the wheel brakes 11, 21, 31 and 41 are generated either according to a booster characteristic that is reduced compared to normal braking or directly in dependence on the actuating force F transmitted to the main cylinder by the driver via the brake pedal 70. This takes place in a BBW system, for example, by the push-through principle, in which the decoupling of the brake pedal 70 and the main cylinder is removed.

In the case of automatic braking, that is to say braking which takes place independently of an actuation initiated by the driver via the brake pedal 70, the brake pressures for the first subsystem SYS-1 and/or the wheel brakes 11, 21, 31 and 41 are generated in dependence on the parameters required for automatic braking, for example vehicle deceleration and vehicle speed. Automatic braking takes place, for example, within the scope of an adaptive control of the vehicle speed known as an ACC (adaptive cruise control) function or an electronic stability control system known as an ESC function, and also in the case of autonomous driving in AD (autonomous driving) operation or RCP (remote controlled parking) operation of the vehicle.

In the case of regenerative braking, that is to say braking in which the kinetic energy of an electric or hybrid vehicle dissipated on braking is converted into electrical energy and fed back into an accumulator (e.g. BAT-1 and/or BAT-2) or the like, the deceleration request initiated by the driver via the brake pedal 70 is first detected, provided that braking is not automatic. In dependence thereon, an electric drive 25, 35 of the vehicle, which here acts on both rear wheels HL and HR, is operated as a generator. In the case of automatic braking, on the other hand, generator operation of the electric drive 25, 35 takes place in dependence on the deceleration required for the automatic braking. If the regenerative braking torque is not sufficient, that is to say the deceleration request (not automatic braking) or the required deceleration (automatic braking) is greater than the maximum achievable deceleration in generator operation, a hydraulic braking torque is additionally applied as compensation in that corresponding brake pressures for the first subsystem SYS-1 and/or the wheel brakes 11, 21, 31 and 41 are generated and regulated. It should be noted that the electric drive of the vehicle, instead of acting on the two rear wheels HL, HR, can of course also act on the two front wheels VL, VR or on all four wheels VL, VR, HL, HR.

If the first subsystem SYS-1 is adapted to generate brake pressures itself by an electrohydraulic principle, which is usually the case with an ESC system, for example, the first subsystem SYS-1 can generate and regulate brake pressures in one or more of the wheel brakes 11, 21, 31 and 41 independently of the second subsystem SYS-2. It is therefore possible in specific variants that automatic braking, in particular the ACC and ESC function, is carried out independently by the first subsystem SYS-1. A further aspect in this connection is that hydraulic actuation of the wheel brakes 11, 21, 31 and 41 is ensured in this case despite a faulty second subsystem SYS-2 or despite faulty hydraulic lines 50, 60, so that the operational reliability of the brake system is increased.

Furthermore, the brake system shown in each of FIG. 1 and FIG. 2 is equipped for the function of a parking brake (also called a locking brake) with an EPB system in order to be able to hold the vehicle stationary in EPB mode. The EPB system comprises a first electric, preferably electromechanical, actuation unit 13 and a second electric, preferably electromechanical, actuation unit 43. The first actuation unit 13 acts on the wheel brake 11 associated with the front wheel VL and the second actuation unit 43 acts on the wheel brake 41 associated with the front wheel VR. In the exemplary embodiments, the EPB system itself does not comprise its own electronic control unit (that is to say its own microprocessor µP or memory device SP), since according to FIG. 1 the first actuation unit 13 can be controlled via a control line 17 by the electronic control unit ECU-1 of the first subsystem SYS-1 and the second actuation unit 43 can be controlled via a control line 47 by the electronic control unit ECU-2 of the second subsystem SYS-2. Accordingly, the corresponding program code for operating the EPB system is stored in the memory devices SP-1 and SP-2 of the first and second subsystems SYS-1 and SYS-2 and is executed by the corresponding microprocessor µP-1 and µP-2 (see FIG. 3).

The EPB system comprises as the input device an actuating element 80 (e.g. a switch or button) via which the driver inputs his control command. The control command—typically "close locking brake" or "open locking brake"—is here detected and evaluated by the electronic control unit ECU-1. According to the result of the evaluation, the first actuation unit 13 of the wheel brake 11 associated with the front wheel VL is actuated. Since actuation of the second actuation unit 43 of the wheel brake 41 associated with the front wheel VR takes place according to FIG. 1 by means of the second electronic control unit ECU-2, the control command is transmitted from the first electronic control unit ECU-1 to the second electronic control unit ECU-2 via the first bus system BUS-1 and/or the second bus system BUS-2. Because of the bus systems BUS-1 and BUS-2 arranged in parallel, there is redundancy, so that fault-tolerant communication between the electronic control units ECU-1 and ECU-2 is ensured.

It is also possible to actuate the EPB system (that is to say in particular the parking brake actuation units 13, 43) independently of an actuation of the operating element 80, that is to say independently of the control request of the driver. This takes place, for example, within the scope of a hill start assistance system known as a HH (hill holder) function, which, by automatically closing the parking brake, prevents the vehicle from rolling on a sloping roadway and, by automatically opening the parking brake (for example in dependence on the angle of slope and/or the torque provided by the drive motor of the vehicle), allows the vehicle to move off comfortably on the sloping roadway. Furthermore, braking or emergency braking can be carried out autonomously by the EPB system, in particular as a fallback level, for example in AD or RCP operation.

Via the two bus systems BUS-1 and BUS-2, the subsystems SYS-1 and SYS-2 are able to communicate with further vehicle systems, for example a third subsystem SYS-3 shown in FIG. 1 and FIG. 2. The third subsystem SYS-3 comprises a third electronic control unit ECU-3 (with an associated microprocessor µP-3 and associated memory device SP-3; see FIG. 3). It is here operated (at least) at the first accumulator BAT-1. For communication with the two subsystems SYS-1 and SYS-2 (and in particular the two electronic control units ECU-1 and ECU-2), the third subsystem SYS-3 (and in particular the third electronic control unit ECU-3) is connected according to FIG. 1 to the first bus system BUS-1 by way of example.

In a variant, the third subsystem SYS-3 is an electronically controlled automatic transmission which is operated by the driver via an input device in the form of an actuating element 90 (for example a selection lever or a selection wheel). In the park or P position of the actuating element 90, the vehicle must additionally be secured, for which purpose a mechanical lock is conventionally provided in the transmission. The outlay for such a mechanical transmission lock can be saved if the EPB system (that is to say in particular the parking brake actuation units 13, 43) assume that function. Thus, when the P position is selected at the actuating element 90, the parking brake is automatically closed and when the actuating element is moved out of the P position, the parking brake is automatically opened.

To that end, the position of the actuating element 90 is detected by the third electronic control unit ECU-3, evaluated and transmitted via the first bus system BUS-1 in parallel to the first electronic control unit ECU-1 and the second electronic control unit ECU-2 so that they can correspondingly activate the first actuation unit 13 of the wheel brake 11 associated with the front wheel VL and the second actuation unit 43 of the wheel brake 41 associated with the front wheel VR according to FIG. 1. Because of the redundancies described above, at least one of the two actuation units 13 and/or 43 of the EPB system can thus always be actuated in order reliably to ensure the functioning of the transmission lock.

Because at least one of the two actuation units 13 and/or 43 of the EPB system can always be actuated on account of the redundancy that exists, the EPB system can also carry out further safety functions in addition to the function of the transmission lock. This is the case, for example, with highly automated driving, in particular in RCP operation of the vehicle, when the vehicle is able to drive, steer and park without the possibility of intervention by the driver. In these applications, the EPB system offers a further fallback level in the event of failure of the first subsystem SYS-1 or of the second subsystem SYS-2, in order, for example, to be able to carry out emergency braking or to be able to hold the vehicle stationary.

In connection with highly automated driving, in particular RCP operation (during which the driver may possibly even be outside the vehicle), the availability of the second subsystem SYS-2 is in any case limited because, owing to the lack of possible intervention by the driver, actuation of the brake pedal 70 for emergency braking is not possible. This is equivalent to a partial (mechanical) failure of the second subsystem SYS-2. However, it is then to be assumed that the associated electronic control unit ECU-2 is operational in order to be able to control at least the second actuation unit 43 of the EPB system via the control line 47 if there should be a (complete) failure of the first subsystem SYS-1.

For even greater safety, it can be provided according to FIG. 2 that the third subsystem SYS-3 (and in particular the third electronic control unit ECU-3) is connected not only to one of the bus systems BUS-1 or BUS-2 but to both bus systems BUS-1 and BUS-2 in parallel in order to ensure redundant communication with the electronic control units ECU-1 and ECU-2. In particular in this connection it can further be provided that one of the actuation units 13 or 43 of the EPB system is controlled directly by the electronic control unit ECU-3 of the third subsystem SYS-3. Thus, it is provided according to FIG. 2 that the second actuation unit 43 of the EPB system is controlled by the electronic control unit ECU-3 of the third subsystem SYS-3 via the control line 47. An important advantage of the motor vehicle system according to FIG. 2 is that, in the event of (e.g. simultaneous) failure of the first subsystem SYS-1 and the second subsystem SYS-2, the EPB system offers a further fallback level in the form of the third subsystem SYS-3 in order, for example, to be able to carry out emergency braking or to be able hold the vehicle stationary.

It is advantageous in the case of the systems according to FIG. 1 and FIG. 2 if, as here, the two actuation units 13 and 43 of the EPB system act on the front wheels VL and VR of the vehicle, since those wheels are able to transmit a considerably greater brake force component than the rear wheels of the vehicle owing to the dynamic axle load distribution. However, the two actuation units 13 and 43 could of course also act on the rear wheels HL and HR of the vehicle.

With regard to the electronic control units ECU-1 to ECU-3, it should be noted that—as shown in FIG. 3—they each comprise at least one microprocessor μP and at least one memory device SP. The respective memory device SP contains program code for execution by the respective microprocessor CμP in connection with the respective desired function (e.g. EPB, transmission lock, BBW service braking, EBB, RCP, etc.). An individual control unit ECU-1 to ECU-3 can also combine two or more of these functions in order to reduce the number of control units required in the vehicle and the costs associated therewith.

Each of the electronic control units ECU-1 to ECU-3 can form an independent assembly. Thus, each of the electronic control units ECU-1 to ECU-3 can have its own housing with its own connections. The electronic control units ECU-1 to ECU-3 can also be fitted at different locations in the vehicle.

Figure 4:
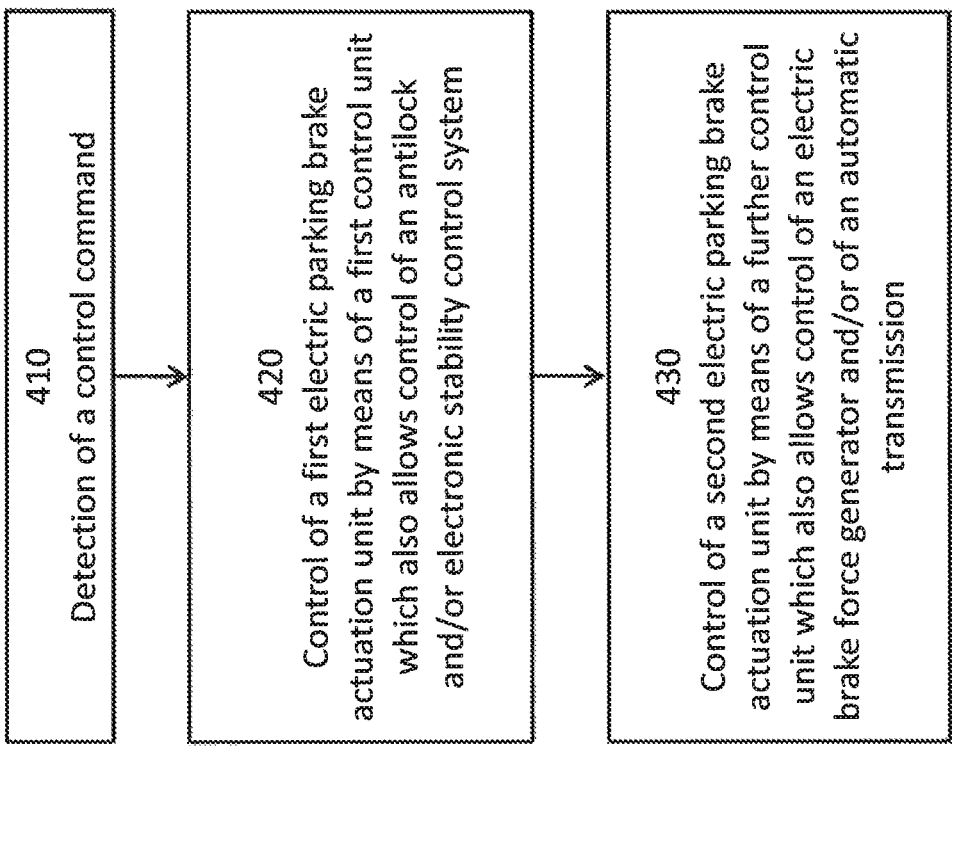
FIGS. 4 & 5 show flow diagrams of methods according to exemplary embodiments of the present disclosure.
Figure 5:
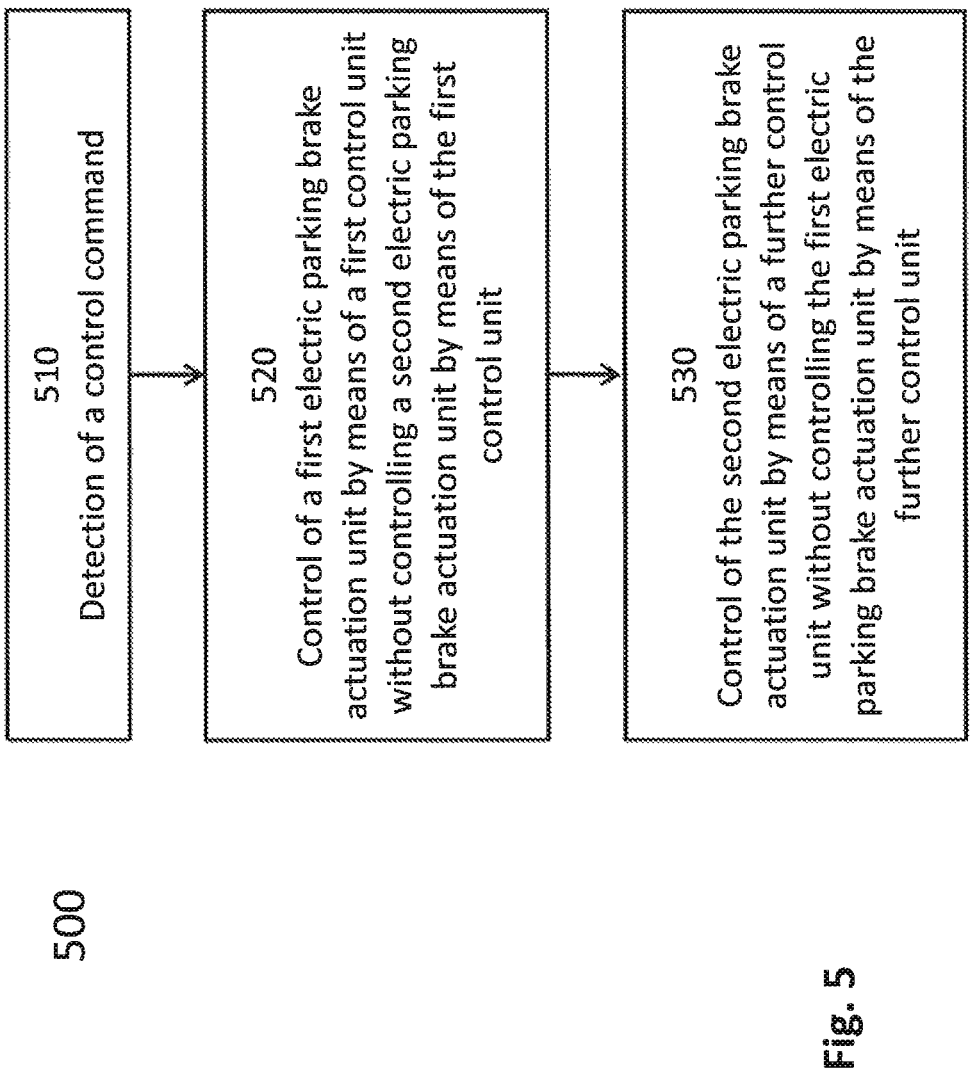

FIGS. 4 and 5 illustrate in flow diagrams 400, 500 two exemplary embodiments of methods for controlling a motor vehicle system according to the present disclosure. The respective method can be carried out by the systems shown in FIGS. 1 and 2 or a system having a different configuration.

With reference to FIG. 4, a control command is detected in a first step 410. The control command can be detected by one of the control units ECU-1 to ECU-3 or a plurality of those control units ECU-1 to ECU-3. According to one variant, the control command is a parking brake command on the part of the driver (for example actuation of the actuating element 80). In another variant, it is a transmission lock command on the part of the driver (for example in a transmission lock mode due to actuation of the actuating element 90). In a further variant, the control command can be an emergency brake command. The emergency brake command can be generated by the system, for example in the event of failure of a brake system component.

On detection of the control command, the first parking brake actuation unit 13 or the second parking brake actuation unit 43 are controlled in steps 420 and 430. Control of the two parking brake actuation units 13, 43 can take place simultaneously or in succession. In general, for example, a first of the control units ECU-1 to ECU-3 can control the parking brake actuation unit associated therewith and at the same time send a control command via the bus system to a second of the control units ECU-1 to ECU-3 in order that that control unit controls the parking brake actuation unit associated therewith.

Specifically, in step 420 the first electric parking brake actuation unit 13 is controlled by means of the first control unit ECU-1. As described above, the first control unit ECU-1 also allows control of the antilock and/or electronic stability control system of the subsystem SYS-1. In step 430, the second electric parking brake actuation unit 43 is controlled by means of the second control unit ECU-2 (see FIG. 1) or the third control unit ECU-3 (see FIG. 2). As already described, this further control unit ECU-2 or ECU-3 also allows control of the electric brake force generator within the subsystem SYS-2 or the automatic transmission according to subsystem SYS-3.

By integrating the parking brake control functionality into the control units ECU-1 to ECU-3, which are also provided for other control purposes, a separate parking brake control unit can be dispensed with. The system costs can thus be reduced. Furthermore, the fact that both parking brake actuation units 13, 43 can be controlled by means of different control units ECU-1 to ECU-3 means that there is redundancy in that, even in the event of failure of one of the control units ECU-1 to ECU-3, at least one of the parking brake actuation units 13, 43 can still be controlled by the remaining control unit(s) ECU-1 to ECU-3.

With reference to FIG. 5, the method shown therein likewise starts with the detection of a control command in step 510. Step 510 corresponds to step 410 already discussed above.

Control of the first electric parking brake actuation unit 13 then takes place by means of the first control unit ECU-1 in step 520 and of the second electric parking brake actuation unit 43 by means of a further control unit (e.g. ECU-2 in FIG. 1 or ECU-3 in FIG. 2). The two control steps 520, 530 can be carried out in parallel or one after the other. Thus, for example, the first control unit ECU-1 can cause the second or third control unit ECU-2 or ECU-3 to control the parking brake actuation unit 43.

Since in the exemplary embodiments of FIGS. 1 and 2 there is only a single control line 17, 47 between the control unit ECU-1 and the parking brake actuation unit 13 and also between the control unit ECU-2 or ECU-3 and the parking brake actuation unit 43, control of the parking brake actuation unit 13 in step 520 takes place in such a manner that the control unit ECU-1 does not control the parking brake actuation unit 43. In the same manner, when the parking brake actuation unit 43 is controlled, the further control unit ECU-2 or ECU-3 does not control the other parking brake actuation unit 13.

Since the control units ECU-1 and ECU-2 or ECU-3 each control only one of the two parking brake actuation units 13, 43, the control units can be made more compact. In particular, each of these control units ECU-1 to ECU-3 requires control components (e.g. power electronics, H bridge, etc.) for only one parking brake actuation unit 13, 43. This saves on installation space and further reduces the thermal load of the respective control unit ECU-1 to ECU-3. At the same time, there is redundancy in that, in the event of failure of one of the control units ECU-1 to ECU-3, the one or more remaining control units ECU-1 to ECU-3 still allow control of at least one parking brake actuation unit 13, 43.

It will be appreciated that individual aspects of the exemplary embodiments described above can also be implemented independently of the provision of parking brake actuation units. The same or other aspects can be implemented independently of the provision of electric control units.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A system for a motor vehicle, comprising:
a first electric parking brake actuation unit assigned to a first vehicle wheel;
a second electric parking brake actuation unit assigned to a second vehicle wheel;
a first control unit having at least one first microprocessor, wherein the first control unit is designed to control at least the first electric parking brake actuation unit and also an antilock and/or electronic stability control system;
a second control unit having at least one second microprocessor, wherein the second control unit is designed to control at least the second electric parking brake actuation unit and also an electric brake force generator; and
a third control unit having at least one third microprocessor, wherein the third control unit is designed to control an automatic transmission and also one of the first and second electric brake actuation units in an event of a failure of the antilock, electronic stability control system, and/or the electric brake force generator.

2. The system as claimed in claim 1, further comprising a control line system which connects the first control unit and the second control unit on the one hand with the first electric parking brake actuation unit and the second electric parking brake actuation unit on the other hand, wherein the control line system consists of a first control line between the first control unit and the first electric parking brake actuation unit and a second control line between the second control unit and the second electric parking brake actuation unit.

3. The system as claimed in claim 1, further comprising a control system which is provided for controlling the first electric parking brake actuation unit and the second electric parking brake actuation unit, wherein the control system consists of the first control unit and the second control unit.

4. The system as claimed in claim 1, wherein the electric brake force generator comprises:
a third electric actuation unit which is configured to act on a main cylinder to generate at least one brake force component.

5. The system as claimed in claim 1, further comprising an input device which is configured to generate a parking brake request.

6. The system as claimed in claim 5, wherein
the input device is electrically coupled at least with the first control unit in order to signal the parking brake request to the first control unit; and
the first control unit is configured to control the first electric parking brake actuation unit in dependence on the parking brake request.

7. The system as claimed in claim 6, further comprising a communication link between the first control unit and the second control unit, wherein the first control unit and the second control unit are designed to communicate with one another via the communication link.

8. The system as claimed in claim 7, wherein the communication link comprises first and second bus systems arranged in parallel with one another between the first and second control units such that the communication link is redundantly designed.

9. The system as claimed in claim 8, further comprising a second communication link comprising third and fourth bus systems arranged in parallel with one another between the first and second bus systems such that the second communication link is redundantly designed.

10. The system as claimed in claim 7, wherein the first control unit is designed to communicate the parking brake request to the second control unit via the communication link.

11. The system at least as claimed in claim 1, wherein the third control unit is designed to control the automatic transmission which is configured without a mechanical transmission lock, and to control the second electric parking brake actuation unit in a transmission lock mode.

12. The system as claimed in claim 11, wherein the third control unit is designed to communicate with the first control unit via a communication link between the first control unit and the third control unit in transmission lock mode in order to cause the first control unit to control the first electric parking brake actuation unit.

13. The system as claimed in claim 1, further comprising:
a first power supply system for the first control unit and/or the first electric parking brake actuation unit; and
a second power supply system for the second control unit and/or the second electric parking brake actuation unit.

14. The system as claimed in claim 1, wherein the first vehicle wheel is a right front wheel and/or the second vehicle wheel is a left front wheel.

15. The system as claimed in claim 1, wherein the first vehicle wheel is a right rear wheel and/or the second vehicle wheel is a left rear wheel.

16. The system as claimed in claim 1, further comprising an electric generator which can be coupled with a right rear wheel and/or a left rear wheel of the vehicle.

17. The system as claimed in claim 1, wherein the first control unit and the second control unit are provided spatially separately from one another.

18. The system as claimed in claim 1, further comprising hydraulic lines for fluidly connecting the antilock and/or electronic stability control system associated with the first control unit with the electric brake force generator associated with the second control unit.

19. The system as claimed in claim 18, wherein the electric brake force generator is configured to generate brake pressures for the antilock and/or electronic stability control system through the hydraulic lines.

20. A method for controlling a motor vehicle system comprising a first electric parking brake actuation unit assigned to a first vehicle wheel, a second electric parking brake actuation unit assigned to a second vehicle wheel, a first control unit having at least one first microprocessor, wherein the first control unit is designed to control at least the first parking brake actuation unit and also an antilock and/or electronic stability control system, and a second control unit having at least one second microprocessor, wherein the second control unit is designed to control at least the second parking brake actuation unit and also an electric brake force generator, a third control unit having at least one third microprocessor, wherein the third control unit is designed to control an automatic transmission and also one of the first and second electrical brake actuation units in an event of a failure of the antilock, electronic stability control system, and/or the electric brake force generator, wherein the method comprises:
controlling the first electric parking brake actuation unit by means of the first control unit;

controlling the second electric parking brake actuation unit by means of the second control unit; and controlling one of the first and second electric parking brake actuation units by means of the third control unit in the event of the failure of the antilock, electronic stability control system, and/or the electric brake force generator.

21. The method as claimed in claim 20, further comprising detecting a control command, wherein the control command is a parking brake request on the part of the driver, a transmission lock request on the part of the driver or an emergency brake request, wherein control of the first electric parking brake actuation unit and of the second electric parking brake actuation unit takes place on detection of the control command.

22. A computer program with program code for carrying out the method as claimed in claim 20 when the method is carried out by the first control unit, the second control unit, and the third control unit.

23. A controller system, comprising:
the computer program as claimed in claim 22; and
the first control unit, the second control unit, and the third control unit which are configured for executing the computer program.

* * * * *